United States Patent
Overstreet (10) Patent No.: US 7,325,512 B2
(45) Date of Patent: Feb. 5, 2008

(54) METHOD FOR HARVESTING AND DISPENSING CROPS

(75) Inventor: Troy E. Overstreet, Sneads, FL (US)

(73) Assignee: Sybelia Investments Ltd, Sneads, FL (US)

( * ) Notice: Subject to any disclaimer, the term of this patent is extended or adjusted under 35 U.S.C. 154(b) by 288 days.

(21) Appl. No.: 11/101,107

(22) Filed: Apr. 7, 2005

(65) Prior Publication Data

US 2006/0027175 A1 Feb. 9, 2006

Related U.S. Application Data (62) Division of application No. 10/910,205, filed on Aug. 3, 2004, now Pat. No. 7,117,817.

(51) Int. Cl.
*A01K 5/00* (2006.01)
*A01D 46/00* (2006.01)

(52) U.S. Cl. .................. 119/61.2; 56/12.9; 56/16.6

(58) Field of Classification Search .......... 119/60, 119/57.01, 57.92, 58, 69, 61.1, 61.2, 61.3, 119/62, 63; 56/12.9, 16.4 R, 16.6
See application file for complete search history.

(56) References Cited

U.S. PATENT DOCUMENTS

| | | | |
|---|---|---|---|
| 275,239 A | | 4/1883 | Marsh |
| 1,175,124 A * | | 3/1916 | Clough ................ 119/53.5 |
| 1,532,276 A * | | 4/1925 | Swartz .................. 119/60 |
| 2,500,889 A * | | 3/1950 | Winkler ................ 119/58 |
| 2,720,070 A * | | 10/1955 | Arrington ............ 56/13.4 |
| 2,936,735 A * | | 5/1960 | Smith ................ 119/52.1 |
| 3,624,697 A * | | 11/1971 | Fuller ................ 56/16.6 |
| 3,748,838 A | | 7/1973 | Woodfill |
| 3,818,955 A * | | 6/1974 | Kline ................ 141/12 |
| 3,840,134 A * | | 10/1974 | Luscombe ............ 414/501 |
| 3,885,524 A * | | 5/1975 | Gregory ................ 119/482 |
| 3,906,901 A * | | 9/1975 | Cox ................ 119/58 |
| 3,918,502 A * | | 11/1975 | Kline ................ 56/344 |
| 3,922,838 A * | | 12/1975 | Kline et al. ............ 56/344 |
| 3,949,706 A * | | 4/1976 | Coon, Jr. ................ 119/60 |
| 3,961,465 A * | | 6/1976 | Winings ................ 56/13.1 |
| 3,972,308 A * | | 8/1976 | Ray ................ 119/60 |
| 3,999,520 A * | | 12/1976 | Feterl ................ 119/58 |
| 4,078,523 A * | | 3/1978 | Etzler ................ 119/58 |
| 4,160,358 A * | | 7/1979 | van der Lely ............ 56/344 |
| 4,449,352 A * | | 5/1984 | Brown ................ 56/13.1 |
| 4,580,529 A * | | 4/1986 | Wilson ................ 119/651 |
| 4,674,265 A * | | 6/1987 | Gerber ................ 56/332 |
| 4,951,450 A | | 8/1990 | Koorn et al. |
| 4,951,452 A * | | 8/1990 | Lundahl et al. ............ 56/341 |

(Continued)

*Primary Examiner*—Yvonne R. Abbott
(74) *Attorney, Agent, or Firm*—John Wiley Horton (57) ABSTRACT

A new method for collecting and dispensing cut crops. The feed crop is cut as in the prior art. A vacuum is used to lift the dried feed crop off the ground and blow it into a mobile storage container. The feed is allowed to compress under its own weight within the storage container. Three or more harvesting cycles can be used to completely fill the storage container. Multiple containers can be used to harvest large feed crops. The containers are then parked in a convenient location awaiting winter. When winter arrives, the feed containers are towed to the feeding area. Doors in the lower portion of the containers are opened to allow access to the feed.

15 Claims, 11 Drawing Sheets

U.S. PATENT DOCUMENTS

| | | | | |
|---|---|---|---|---|
| 4,981,407 A | * | 1/1991 | Johnson | 414/24.5 |
| 5,001,893 A | | 3/1991 | Stanley et al. | |
| 5,011,893 A | * | 4/1991 | Miyamoto et al. | 525/420.5 |
| 5,076,752 A | * | 12/1991 | Rader | 414/470 |
| 5,092,273 A | * | 3/1992 | Meyer | 119/52.4 |
| 5,197,266 A | * | 3/1993 | Kambeitz | 56/13.1 |
| 5,205,241 A | * | 4/1993 | Halpin et al. | 119/60 |
| 5,501,067 A | * | 3/1996 | Brown | 56/121.4 |
| 5,718,096 A | * | 2/1998 | Nowara | 52/794.1 |
| 5,743,211 A | * | 4/1998 | Schoessow | 119/58 |
| 5,806,290 A | * | 9/1998 | Deutsch et al. | 56/32 |
| 5,964,081 A | * | 10/1999 | Ingram | 56/14.5 |
| 6,050,073 A | * | 4/2000 | Nevarez, Sr. | 56/327.1 |
| 6,205,756 B1 | * | 3/2001 | Orsborn et al. | 56/30 |
| 6,213,053 B1 | * | 4/2001 | Lammers | 119/51.01 |
| 6,550,421 B1 | * | 4/2003 | Sturgis | 119/57.92 |
| 2006/0016167 A1 | * | 1/2006 | Banowetz | 56/344 |

* cited by examiner

METHOD FOR HARVESTING AND DISPENSING CROPS

CROSS-REFERENCES TO RELATED APPLICATIONS

This is a divisional application of U.S. application Ser. No. 10/910,205 (filing date of Aug. 3, 2004) now U.S. Pat. No. 7,117,817. The earlier filed application is by the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of agriculture. More specifically, the invention comprises an animal feed harvesting system wherein the feed is vacuumed into a series of large containers for storage and subsequent delivery to farm animals.

2. Description of the Related Art

It is common in the field of agriculture to grow food crops for subsequent feeding to animals. These crops must be produced during the growing season, but are typically fed to the animals during the winter months. Typical food crops include hay, alfalfa, and peanuts. Hay harvesting provides a good example of the prior art approach.

Hay is grown to a desired height. A sickle-bar mower is then passed through the hay to shear the stalks near ground-level. The sheared hay is then allowed to sit in the sun for several days (assuming the weather cooperates) in order to dry. Once sufficiently dried, a hay rake is passed over the loose material in order to bunch it into lofted rows. A hay baler then run over the lofted rows. The bailer gathers the cut material and compresses it into round or square hay bails, typically bound by twine or sheet plastic.

These hay bales must be loaded and conveyed to a storage barn. They will remain in the barn until needed in the winter. At that point the bales are reloaded and transported out to the animals. They are then typically placed in a feeding device (a "stock feeder"). The feeding device limits the animals' complete access to the hay so that they can eat it without stomping it into the ground or otherwise spoiling it.

The reader will thereby appreciate that the prior art approach to a feeding cycle contemplates many operations, including:

1. Cutting the hay;
2. Drying the hay in the sun;
3. Raking the hay into rows;
4. Baling the hay;
5. Transporting the hay bales to a storage barn;
6. Transporting the hay bales from the storage barn to the feeding area; and
7. Placing the bales in a stock feeder.

The prior art is obviously labor intensive. It also results in a substantial loss of nutritional value. The prior art operation typically does not harvest the plant leaves, since these are lost in the drying, raking, and baling operations (particularly through the use of wire-toothed pick up wheels on the balers). A great deal of nutritional value is found in the leaves, and this is lost. A system which reduces or eliminates these problems is obviously desirable.

BRIEF SUMMARY OF THE INVENTION

The present invention comprises a new type of feed crop harvesting system. The feed crop is cut as in the prior art. A vacuum is used to lift the dried feed crop off the ground and blow it into a mobile storage container. The feed is allowed to compress under its own weight within the storage container. Three or more harvesting cycles can be used to completely fill the storage container.

Multiple containers can be used to harvest large feed crops. The containers are then parked in a convenient location awaiting winter. When winter arrives, the feed containers are towed to the feeding area. Doors in the lower portion of the containers are opened to allow access to the feed. The animals pull the feed from the containers. Gravity pulls the containers' contents down to the open feeding ports. The animals are thereby able to completely empty the contents of the portable

REFERENCE NUMERALS IN THE DRAWINGS 10 harvesting assembly 12 tractor
14 vacuum 16 storage container
18 chassis 20 wheel
22 tongue 24 hitch ball receiver
26 intake port 28 nose shroud
30 roof 32 side wall
34 front wall 36 feeding door
38 curing door 40 back wall
42 vent 44 main wheel
46 support wheel 48 vacuum head
50 ejector chute 52 hitch frame
54 hydraulic cylinder 56 lifting carriage
58 hitch ball 60 ejected feed
62 louver 64 elevation jack
66 pad 68 ventilation port
70 feed 72 stabilizer
74 supplemental blower 76 deflector
78 center marker 80 air flow
82 feeding port

DESCRIPTION OF THE INVENTION

The present invention contemplates that the crop to be harvested must first be cut using prior art methods. Hay harvesting will again be used as a common example. A sickle-bar mower is passed through the crop to shear the stalks off near ground level. They remain on the ground in an un-raked state.

Figure 1:
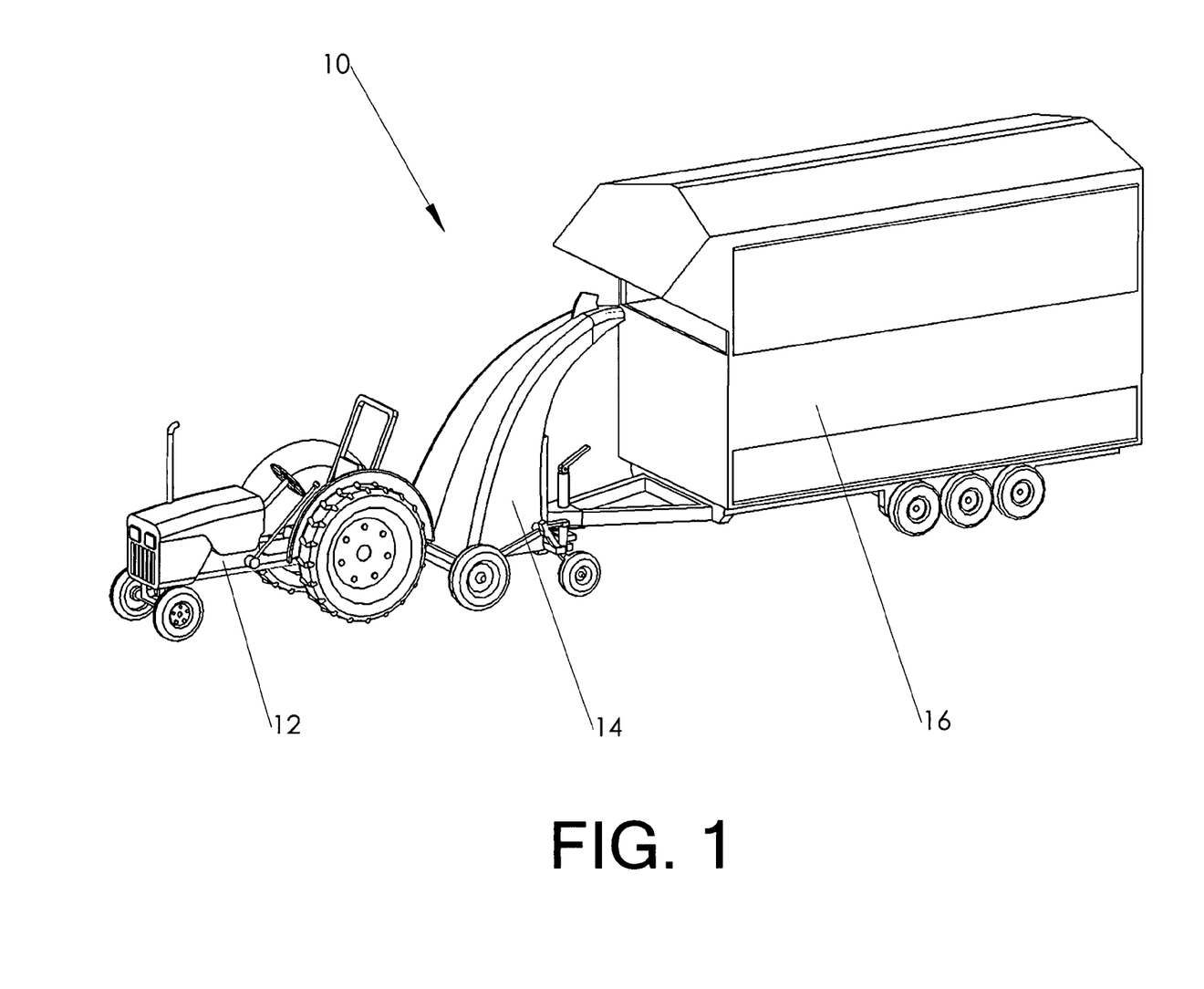
FIG. 1 is a perspective view, showing the harvesting assembly.

FIG. 1 shows the major components used in the present invention, designated as harvesting assembly 10. Tractor 12 tows vacuum 14 and storage container 16. The components are preferably connected by pivoting hitches, so that reasonably tight turns are possible. The tractor provides power to the vacuum via a rotating PTO shaft.

Harvesting assembly 10 is run through the sheared crop. Vacuum 14 sucks the crop up off the ground and discharges it into storage container 16. Sets of wheels are provided on the vacuum and the storage container so that they will roll along the ground with the tractor offering minimal rolling resistance.

Figure 2:
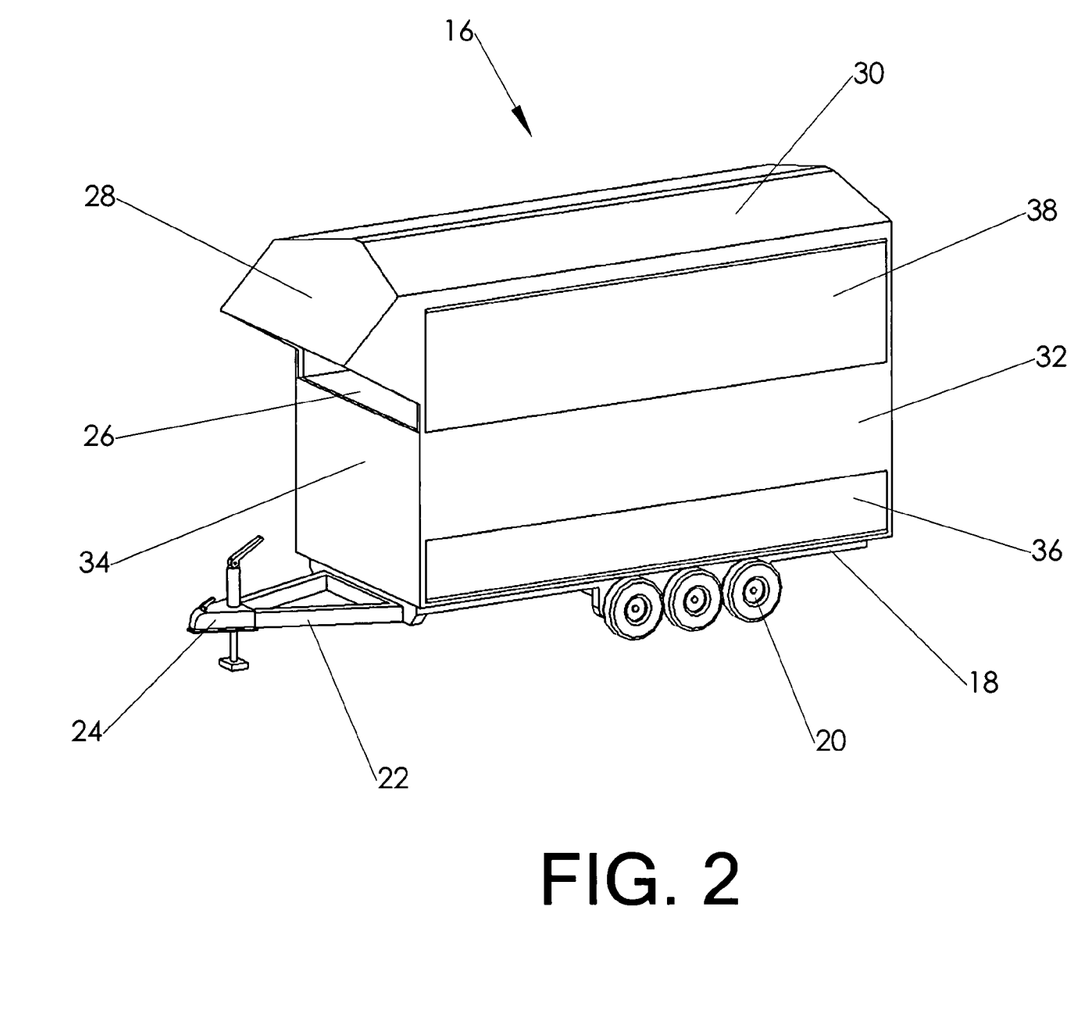
FIG. 2 is a perspective view, showing the portable storage container.

FIG. 2 shows more detail of storage container 16. Chassis 18 provides structural support. It mounts a plurality of wheels 20, using common features such as leaf springs and axles. Tongue 22 extends from the front portion of chassis 18. It features a coupling device. For the particular embodiment shown, hitch ball receiver 24 is used.

Front wall 34 faces the vacuum when the storage container is used in the harvesting operation. It features intake port 26, which is simply an opening into the container's hollow interior. The hollow interior is bounded by the chassis, front wall 34, two side walls 32, a back wall, and roof 32.

Nose shroud 28 is attached over intake port 26. It includes two side walls and a downward sloping front wall. The purpose of nose shroud 28, which will be more thoroughly explained subsequently, is to direct projected materials into intake port 26.

Other openings are provided to allow access to the hollow interior of the storage container. On the side wall 32 facing the viewer, a feeding door 36 is provided. This can be opened to provide access to the container's contents. Higher on the side wall, a curing door 38 may optionally be provided. This is used to provide extra ventilation if the container's contents need to be dried. The far side wall 32 may also contain feeding and curing doors.

Figure 3:
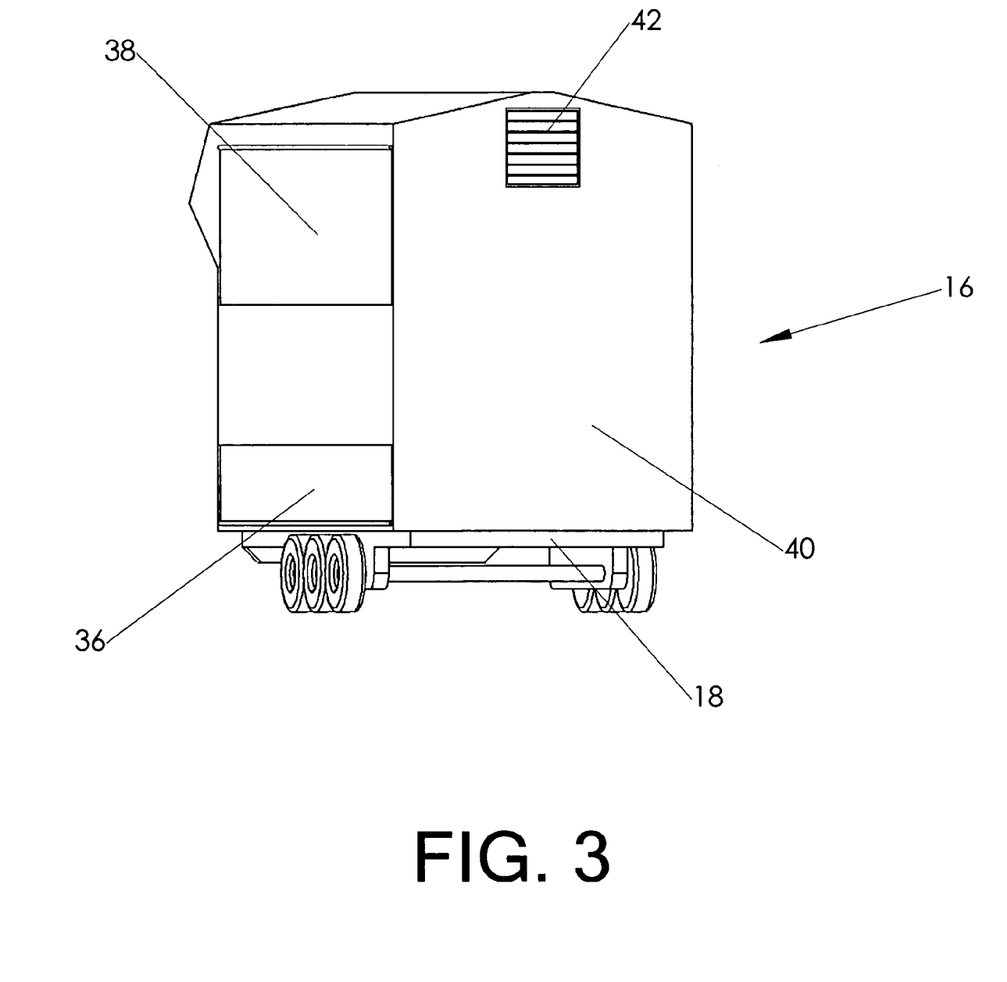
FIG. 3 is a perspective view, showing the rear of the storage container.

FIG. 3 shows storage container 16 from the back. Back wall 40 includes vent 42 near its upper extreme. This vent can be opened in order to allow air flow coming in through the intake port to exit the container.

Figure 4:
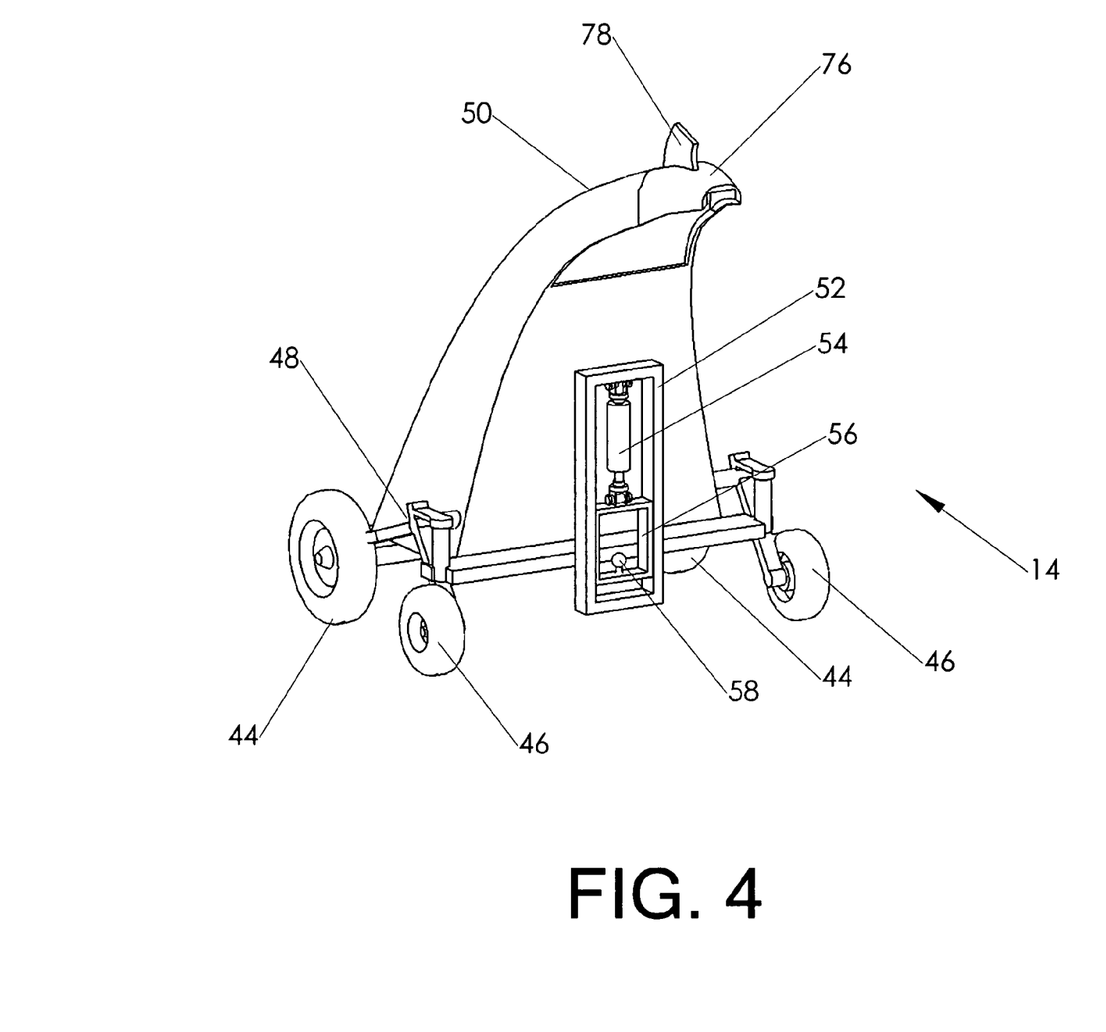
FIG. 4 is a perspective view, showing the vacuum.

FIG. 4 shows vacuum 14 in greater detail. It includes a pivoting hitch on its front end (obscured in the view) which allows its attachment to the tractor. A rotary PTO shaft also feeds power into the forward end of the vacuum. Two main wheels 44 support the weight of the device, while two support wheels 46 (which are mounted on pivots) keep the device level.

Vacuum head 48 contains a vacuum-creating device (such as a rotary impeller or series of fans). The PTO shaft powers the vacuum-creating device. Openings on the lower side of vacuum head 48 provide access to the vacuum created within vacuum head 48. Thus, as the device rolls along, loose materials on the ground are sucked into the vacuum head. They are then propelled upward and rearward through ejector chute 50. They are then ejected out deflector 76 at considerable velocity. The pitch of deflector 76 can be adjusted relative to the ejector chute in order to adjust the pitch of the stream of ejected material. All these features of vacuum 14 just described are known in the art. Thus, these components (such as the internal details of the vacuum-creating device) have not been described in further detail. Suffice it to say that the device sucks loose material off the ground and propels it out the open end of deflector 76.

Several novel features have been added to the vacuum, however, in order to accommodate its use in the present invention. The need for these will now be explained, returning briefly to FIG. 1. When harvesting the crop, the tractor and vacuum will run a course over the cut material until the storage container is full. At this point, the storage container will be parked and a new (and empty) storage container will be attached to the vacuum. The process continues until the crop is harvested. Thus, many storage containers may be used.

Further, the storage container will initially fill up with uncompacted crop material. It can then be parked for several days or weeks while gravity settles the contents. It may then be attached to the vacuum and filled with additional material. Those skilled in the art will know that a farmer can often achieve three hay cuttings per growing season. By the time the second cutting arrives, the contents of the first cutting will have settled far enough to allow a previously full storage container to accept another load.

These practical considerations make plain that several storage containers will typically be in use, and that they must be easily connected and disconnected from the vacuum. Returning now to FIG. 4, the mechanisms facilitating this easy connectivity will be explained. Hitch frame 52 is mounted on the rear of vacuum 14. Lifting carriage 56 slides up and down within hitch frame 52. In the embodiment shown, it is propelled up and down via hydraulic cylinder 54. Other devices could be substituted, such as an electric or hydraulic screw drive.

Hitch ball 58 is mounted on lifting carriage 56. The hydraulic supply to hydraulic cylinder 54 is provided by tractor 12 (using one of the tractor's auxiliary circuits). Thus, the tractor operator can control the raising and lowering of hitch ball 58 without leaving the tractor's seat.

Figure 5:
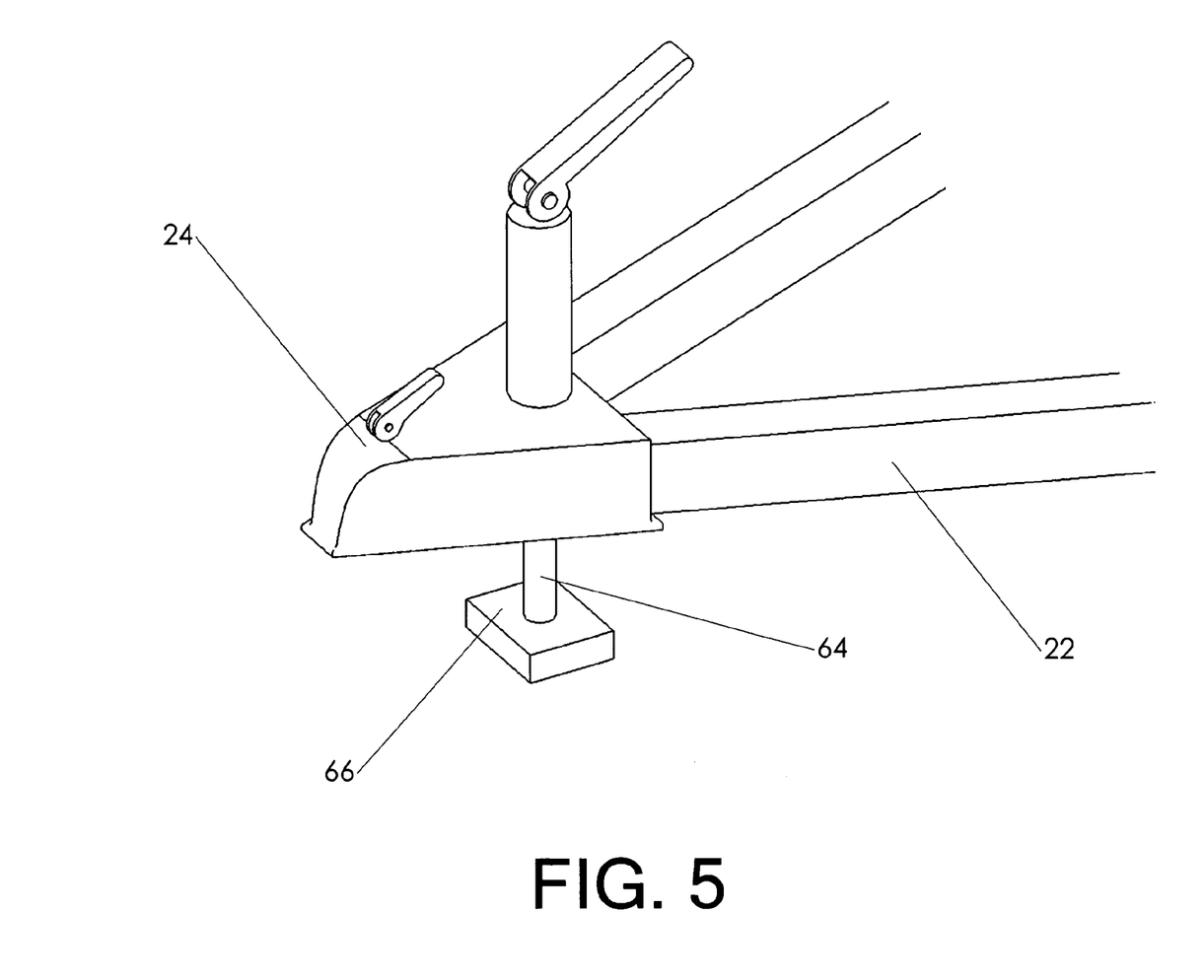
FIG. 5 is a perspective view, showing the tongue and hitch on the front of the storage container.

FIG. 5 shows the forward portion of tongue 22 on chassis 18. It includes ball hitch receiver 24, which is sized to clamp over hitch ball 58. An elevation jack 64 with a descending pad 66 is preferably also provided. Elevation jack 64 is adjusted so that ball hitch receiver 24 rests above the position of hitch ball 58 when lifting carriage 56 is lowered to its lowest position. In order to attach a particular storage container, the user backs the tractor and vacuum up to the storage container until hitch ball 58 lies beneath hitch ball receiver 24. The user then actuates hydraulic cylinder 54 to raise the hitch ball into the ball hitch receiver. The user then continues raising the hitch ball in order to raise pad 66 well clear of the ground. At this point the storage container can be towed forward.

To park a particular storage container the reverse procedure is followed. The user maneuvers the storage container into the desired position. The user then lowers the hitch ball. The hitch ball comes free of the receiver and the tongue's weight will then rest on pad 66.

Of course, the user cannot see the location of the hitch ball or receiver while he or she is backing the tractor and vacuum. Returning to FIG. 4, the reader will observe that center marker 78 has been added to the top of the vacuum. The user can align this feature with the center of the storage container (which can be provided with suitable alignment markings) in order to align the hitch ball. The user then backs the tractor until the hitch frame contacts the forward portion of the ball hitch receiver. At this point, the alignment is proper and the hitch ball can be raised to couple the storage container.

Figure 6:
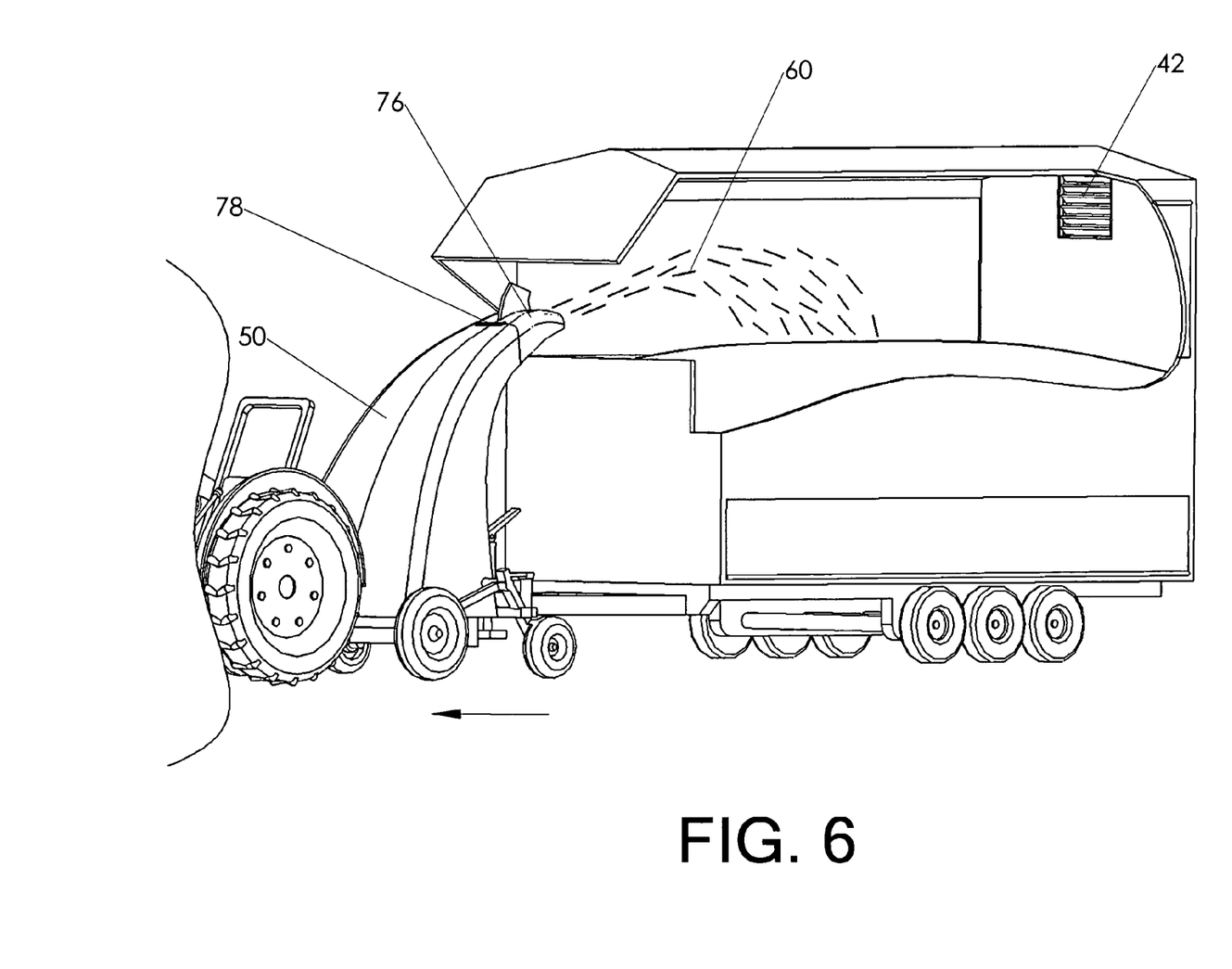
FIG. 6 is a perspective view with a cutaway, showing the harvesting operation.

FIG. 6 shows the assembly of FIG. 1 in operation. The cutaway shows the hollow interior of the storage container. The reader will observe ejected feed 60 being ejected out of deflector 76, through the intake port, and into the interior of the storage container. Hinge 78 allows the angle of deflector 76 to be adjusted with respect to ejector chute 50. Using this adjustment, the user can direct the ejected feed at the appropriate angle so that it evenly accumulates in the bottom of the storage container.

Figure 7:
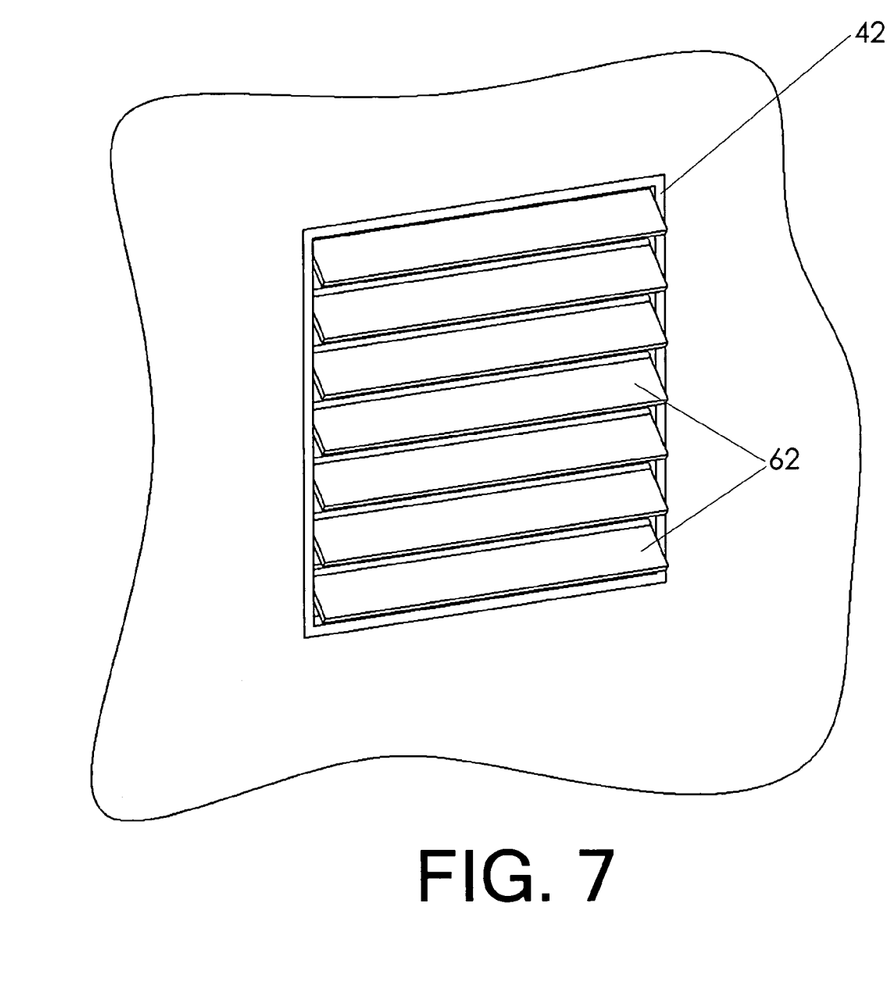
FIG. 7 is a detail view, showing the vent in the rear of the storage container.

Vent 42 is opened to allow the air flow carrying the ejected feed to escape the rear of the storage container. FIG. 7 shows a detailed view of vent 42, which preferably includes a series of louvers 62. These louvers are biased toward the closed position by gravity or small springs. When air flows into and through the storage container, they open in order to allow the air to escape (thereby allowing free flow).

Figure 8:
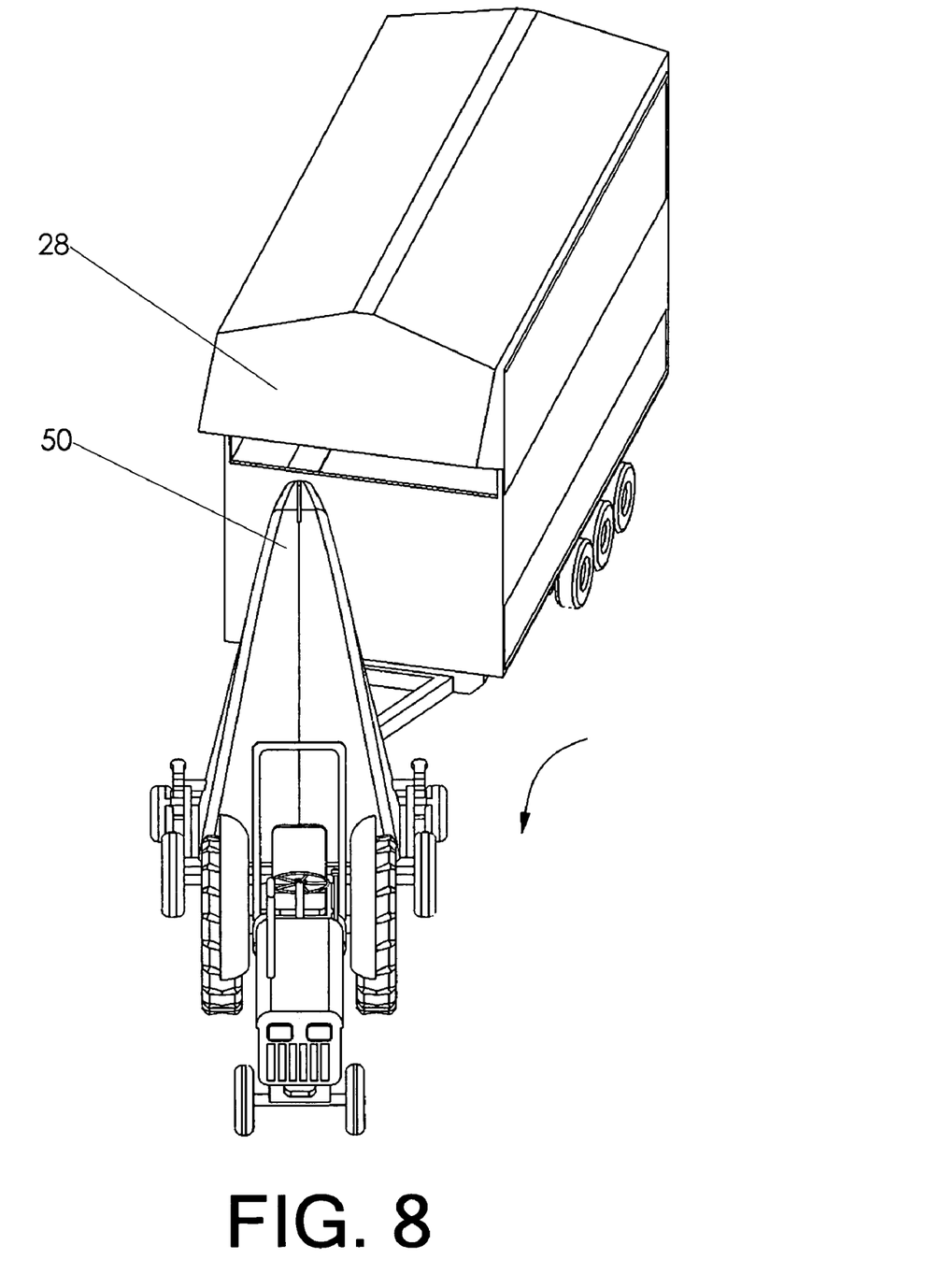
FIG. 8 is a perspective view, showing the harvesting assembly in a turn.

Those skilled in the art will know that the assembly shown in FIG. 1 must be able to turn. FIG. 8 shows the assembly in a left-hand turn. In a fairly tight turn, the ejected feed issuing from ejector chute 50 may miss intake port 26 in front wall 34 (It will tend to shoot out to one side). Nose shroud 28 is provided to remedy this problem. Nose shroud 28 includes two side walls and a downward-sloping front wall. The side walls tend to deflect any errant stream of feed back into the intake port. The nose shroud can also accommodate pitch undulations between the vacuum and the storage container. If the ejector chute pitches upward with respect to the storage container, the forward wall of the nose shroud will deflect the feed into the intake port.

Figure 9:
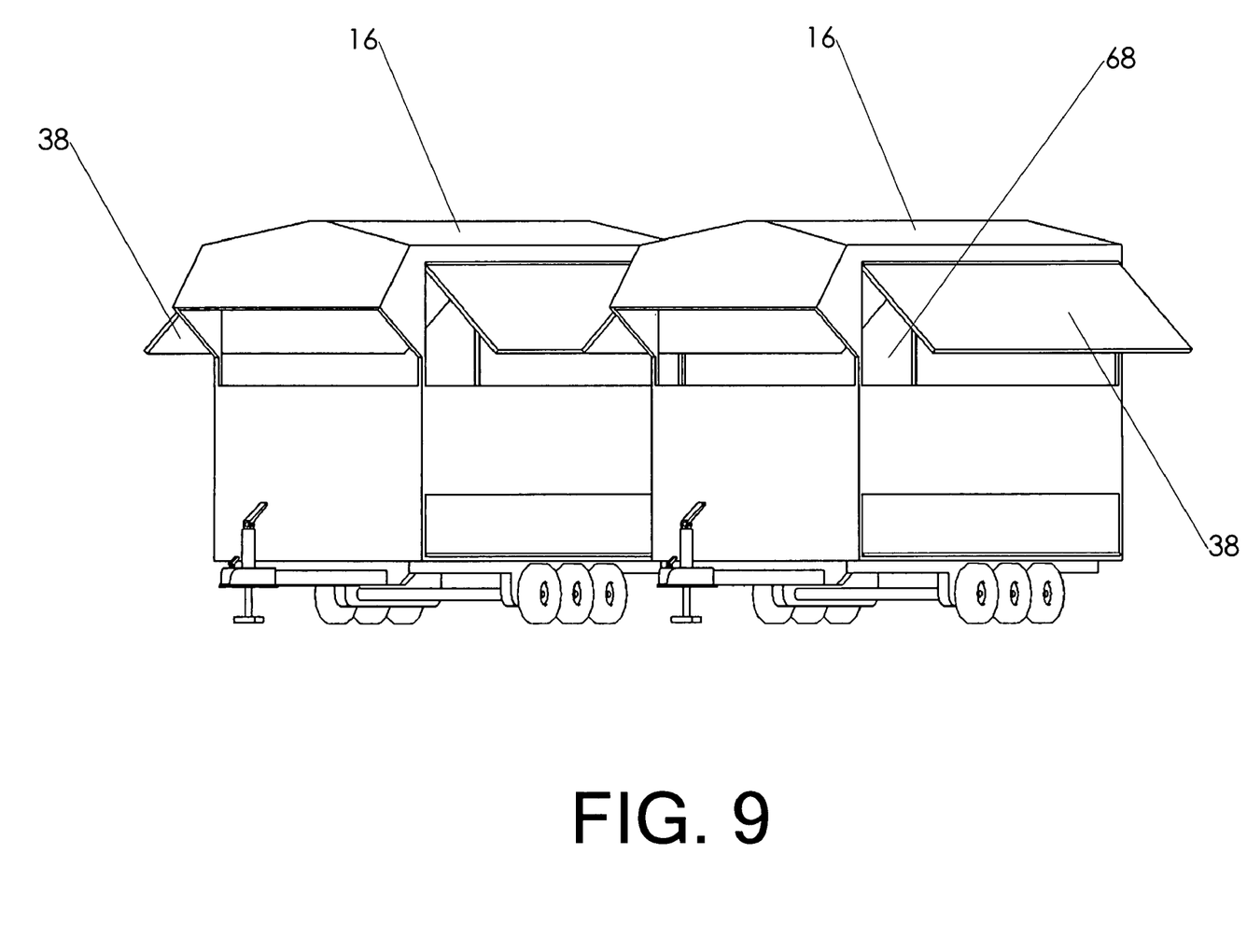
FIG. 9 is a perspective view, showing two storage containers.

Once a storage container is full, it is parked until the contents are needed. FIG. 9 shows two storage containers 16 parked side by side. For some applications it may be desirable to allow moisture to escape from the stored feed. If this is the case, ventilation ports 68 covered by curing doors 38 are provided. These curing doors can be opened—as shown—in order to allow additional air circulation through the container. Adjustment means can be provided to hold the curing doors in a desired position. Of course, some embodiments will not need this feature and will therefore omit the ventilation ports and curing doors altogether.

Figure 10:
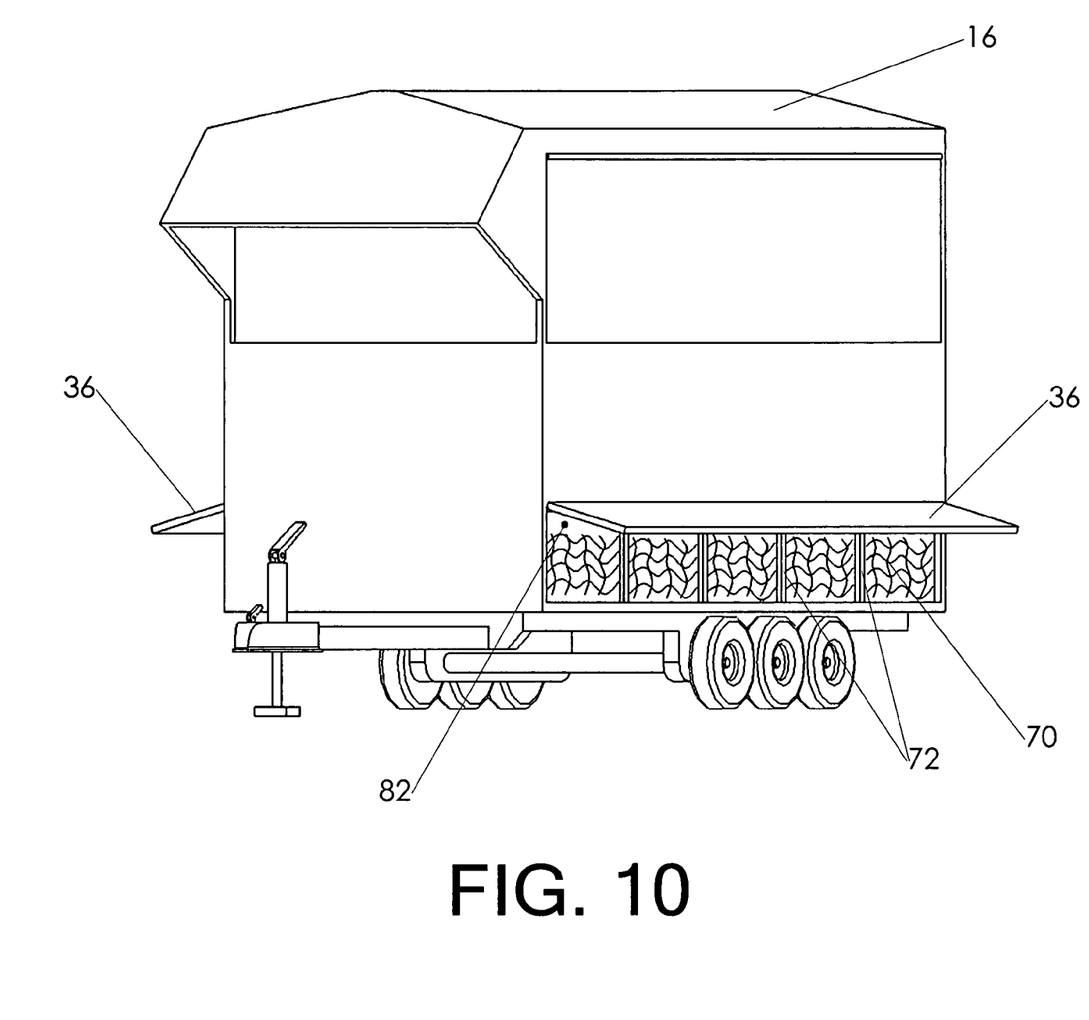
FIG. 10 is a perspective view, showing a storage container open for feeding.

When the time comes to dispense the feed, the storage container is towed to the desired feeding location. FIG. 10 shows a storage container 16 configured to dispense the feed. Feeding doors 36 are locked open to expose feeding ports 82 (which can be provided on both sides of the storage container). If the feed is prone to falling out, stabilizers 72 can be added. These retain the feed and force the animals to pull the feed out of the container. This produces a steady and controlled feeding process.

Figure 11:
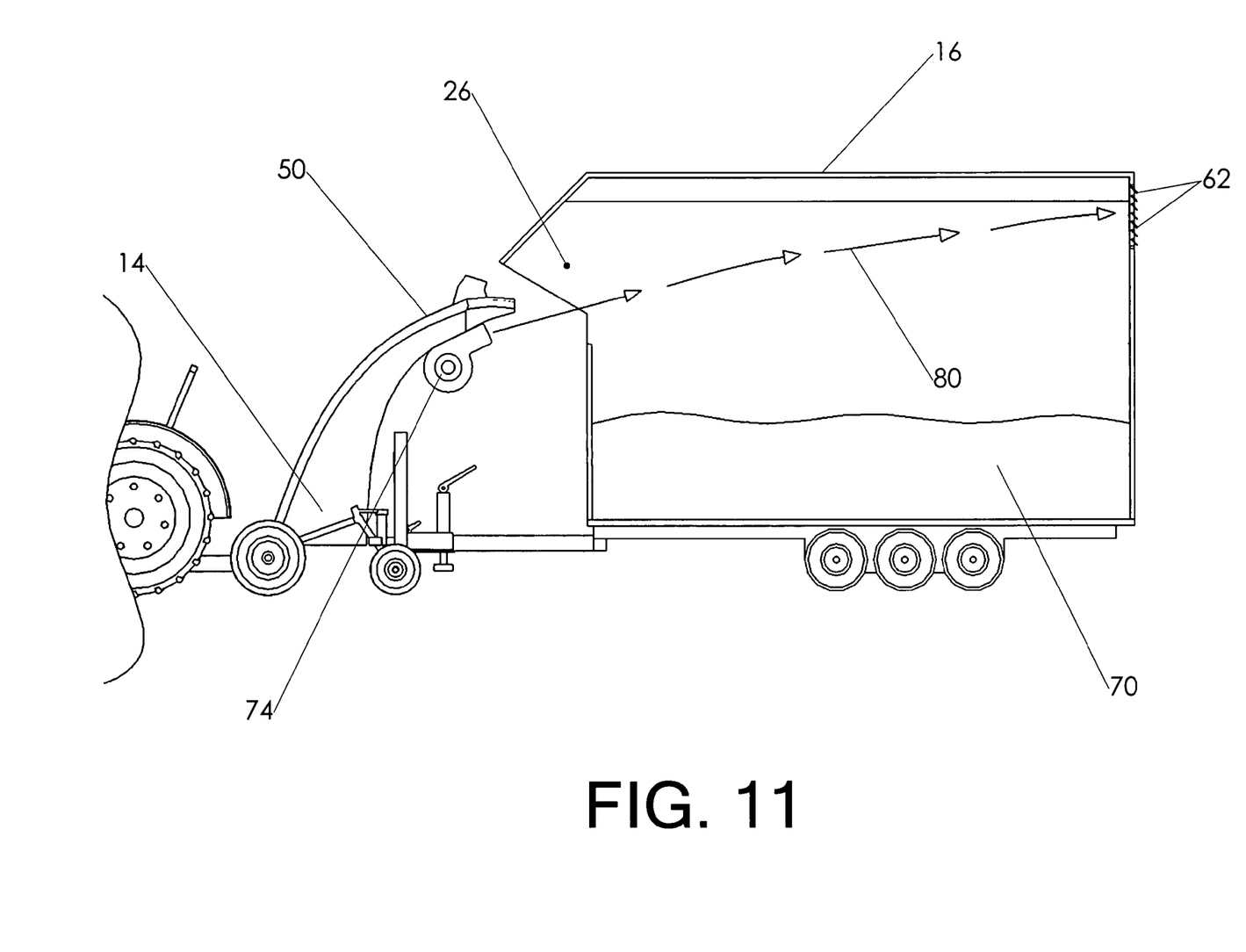
FIG. 11 is a side elevation view, showing the air flow created by a supplemental blower.

For certain types of crops the embodiments previously described may not evenly fill the storage container. An additional element is therefore needed. FIG. 11 shows this element. Supplemental blower 74 is added to direct air flow 80 as indicated by the arrows. This air flow tends to loft the material elected from the ejector chute a bit higher and further back in the storage container. The supplemental blower is preferably mounted on the underside of the ejector chute, though it could be mounted on the storage container or some other location.

The supplemental blower can be powered by an auxiliary drive belt off of the main vacuum-producing device down in the vacuum head. On the other hand, it can be powered by an electrical motor. Such a motor could be fed DC current by the tractor. Other power sources (such as hydraulic pressure) could also be used.

The position and orientation of the auxiliary blower can be made adjustable, so that the air flow can be precisely directed. This adjustment, which is optional, would allow fine-tuning for different sorts of harvested crops.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the following claims, rather than by the examples given.

The invention claimed is:

1. A method for harvesting cut crops from the ground for feeding to animals, comprising:
    a. providing a vacuum, said vacuum having a vacuum head for lifting said cut crops off said ground and a rearward facing ejector chute for receiving said cut crops from said vacuum head and directing it rearward, said vacuum having a front portion and a rear portion;
    b. providing a first storage container, said first storage container having a hollow interior and an intake port opening into said hollow interior, and wherein said first storage container is configured to be pulled behind said vacuum and receive said cut crops propelled from said ejector chute of said vacuum, said first storage container having a front portion and a rear portion;
    c. providing an attachment means for attaching said first storage container behind said vacuum, said attachment means including a ball hitch, said ball hitch attached to said rear portion of said vacuum and a ball hitch receiver attached to said front portion of said first storage container;
    c. attaching said first storage container behind said vacuum by said attachment means;
    d. pulling said vacuum over said cut crops so that said cut crops are lifted from said ground by said vacuum, propelled through said ejector chute, and received in said hollow interior of said first storage container;
    e. storing said cut crops in said first storage container; and
    f. dispensing said cut crops from said first storage container to said animals.

2. The method of claim 1, further comprising detaching said first storage container from behind said vacuum when said first storage container is full of said cut crops.

3. The method of claim 2 further comprising:
    a. providing a second storage container, said second storage container having a hollow interior and an intake port opening into said hollow interior, and wherein said second storage container is configured to be pulled behind said vacuum and receive said cut crops propelled from said ejector chute of said vacuum;
    b. providing an attachment means for attaching said second storage container behind said vacuum;
    c. attaching said second storage container behind said vacuum by said attachment means; and
    d. pulling said vacuum over said cut crops so that said cut crops are lifted from said ground by said vacuum, propelled through said ejector chute, and received in said hollow interior of said first storage container.

4. The method of claim 1, wherein said vacuum is attachable to the rear of a tractor.

5. The method of claim 4, wherein said vacuum is attachable to said tractor using a pivot joint.

6. The method of claim 1, said first storage container further comprising a front portion, a rear portion, and a vent located proximate said rear portion of said first storage container, said vent positioned to allow air propelled into said hollow interior by said ejector chute to escape said hollow interior.

7. The method of claim 6, said vent further comprising closing features biased to close said vent when said vacuum is not in operation.

8. The method of claim 1, further comprising:
    b. allowing said cut crops to dry in said first storage container;
    c. pulling said vacuum over additional cut crops so that said additional cut crops are lifted from said ground by said vacuum, propelled through said ejector chute, and received in said hollow interior of said first storage container.

9. The method of claim 1, said ejector chute comprising a first end proximate to said vacuum head and a second end distal to said vacuum head, said vacuum further comprising a supplemental blower positioned proximate to said second end of said ejector chute and configured to direct air flow into said intake port and project said cut crops deeply into said first storage container.

10. A method for harvesting cut crops from the ground for feeding to animals, comprising:
   a. providing a vacuum, said vacuum having a vacuum head for lifting said cut crops off said ground and a rearward facing ejector chute for receiving said cut crops from said vacuum head and directing it rearward;
   b. providing a first storage container, said first storage container having a hollow interior and an intake port opening into said hollow interior, and wherein said first storage container is configured to be pulled behind said vacuum and receive said cut crops propelled from said ejector chute of said vacuum, said first storage container further comprising a wall having an upper extreme and a lower extreme, and a feeding port for dispensing said cut crops to said animals is located in said wall proximate to said lower extreme;
   c. providing an attachment means for attaching said first storage container behind said vacuum;
   d. attaching said first storage container behind said vacuum by said attachment means;
   e. pulling said vacuum over said cut crops so that said cut crops are lifted from said ground by said vacuum, propelled through said ejector chute, and received in said hollow interior of said first storage container;
   f. storing said cut crops in said first storage container; and
   g. dispensing said cut crops from said first storage container to said animals.

11. The method of claim 10, said first storage container further comprising a feeding door, proximate said feeding port, and movable between a closed position wherein said feeding port is covered and an open position wherein said feeding port is uncovered.

12. A method for harvesting cut crops from the ground for feeding to animals, comprising:
   a. providing a vacuum, said vacuum having a vacuum head for lifting said cut crops off said ground and a rearward facing ejector chute for receiving said cut crops from said vacuum head and directing it rearward;
   b. providing a first storage container, said first storage container having a hollow interior and an intake port opening into said hollow interior, and wherein said first storage container is configured to be pulled behind said vacuum and receive said cut crops propelled from said ejector chute of said vacuum, said first storage container further comprising a wall having an upper extreme, a lower extreme, and a curing door, said curing door located in said wall proximate said upper extreme, and wherein said curing door can be opened to allow moisture to escape said first storage container;
   c. providing an attachment means for attaching said first storage container behind said vacuum;
   d. attaching said first storage container behind said vacuum by said attachment means;
   e. pulling said vacuum over said cut crops so that said cut crops are lifted from said ground by said vacuum, propelled through said ejector chute, and received in said hollow interior of said first storage container;
   f. storing said cut crops in said first storage container; and
   g. dispensing said cut crops from said first storage container to said animals.

13. A method for harvesting cut crops from the ground for feeding to animals, comprising:
   a. providing a vacuum, said vacuum having a vacuum head for lifting said cut crops off said ground and a rearward facing ejector chute for receiving said cut crops from said vacuum head and directing it rearward;
   b. providing a first storage container, said first storage container having a hollow interior and an intake port opening into said hollow interior, and wherein said first storage container is configured to be pulled behind said vacuum and receive said cut crops propelled from said ejector chute of said vacuum, said first storage container further comprising a nose shroud placed around said intake port and positioned to deflect said cut crop issuing from said ejector chute into said intake port;
   c. providing an attachment means for attaching said first storage container behind said vacuum;
   d. attaching said first storage container behind said vacuum by said attachment means;
   e. pulling said vacuum over said cut crops so that said cut crops are lifted from said ground by said vacuum, propelled through said ejector chute, and received in said hollow interior of said first storage container;
   f. storing said cut crops in said first storage container; and
   g. dispensing said cut crops from said first storage container to said animals.

14. A method for harvesting cut crops from the ground for feeding to animals, comprising:
   a. providing a vacuum, said vacuum having a vacuum head for lifting said cut crops off said ground and a rearward facing ejector chute for receiving said cut crops from said vacuum head and directing it rearward;
   b. providing a first storage container, said first storage container having a hollow interior and an intake port opening into said hollow interior, and wherein said first storage container is configured to be pulled behind said vacuum and receive said cut crops propelled from said ejector chute of said vacuum;
   d. providing an attachment means for attaching said first storage container behind said vacuum;
   d. attaching said first storage container behind said vacuum by said attachment means;
   e. pulling said vacuum over said cut crops so that said cut crops are lifted from said ground by said vacuum, propelled through said ejector chute, and received in said hollow interior of said first storage container;
   f. storing said cut crops in said first storage container; and
   g. dispensing said cut crops from said first storage container to said animals;
   h. wherein
      said first storage container has a front portion and a rear portion, and a ball hitch receiver located proximate said front portion of said first storage container; and
   i. wherein said vacuum has a front portion and a rear portion, and wherein said vacuum includes
      a hitch frame mounted on said rear portion of said vacuum,
      a lifting carriage, slidably mounted within said hitch frame,
      a hitch ball mounted to said lift carriage, and
      a lifting device for raising and lowering said lift carriage within said hitch frame.

15. The method of claim 14, wherein said lifting device can be actuated from a tractor.

* * * * *